UNITED STATES PATENT OFFICE.

GEORGE JORDAN, OF NEW YORK, N. Y.

PAINT COMPOSITION.

SPECIFICATION forming part of Letters Patent No. 355,019, dated December 28, 1886.

Application filed April 22, 1886. Serial No. 199,799. (Specimens.)

*To all whom it may concern:*

Be it known that I, GEORGE JORDAN, of the city, county, and State of New York, have invented certain new and useful Improvements in Paint Compositions, of which the following is a specification.

This invention relates to an improved water-proof paint composition that is intended to be used in the manufacture of wall-paper, and be applicable for fresco-painting on walls and ceilings, and for the outside painting of houses and fences, it having the advantage that it can be made up in liquid or dry state and used directly without decomposing by exposure to the air.

The invention consists of a paint composition composed of a solution of gutta-percha in spirits of turpentine mixed with a gum, soluble in turpentine, and a suitable pigment.

In preparing my improved paint composition, six and a half pounds of gutta-percha are dissolved in twenty-five gallons of spirits of turpentine, and then mixed with twelve and a half pounds of Venetian turpentine, or any other resin gum that is soluble in turpentine, which solution is mixed with one hundred pounds of any kind of pigment—such as chrome-yellow, white lead, zinc-white, vermillion, &c.—in powder shape, to form an easily-running paint composition. The proportions, however, may be varied according to the nature of the pigment that is to be mixed with the gutta-percha solution and the gum.

The gutta percha and gum solution impart to the paint the quality of being water-proof, so that it can be applied for indoor and outdoor uses, and forms thereby a more permanent paint for wall-paper and other purposes.

The paint composition is preferably made up in liquid form, and is not liable to deteriorate. All that is required before application is to stir the same properly, so that the pigment that has settled is uniformly mixed again with the water-proof solution.

When applying the paint to the paper in the manufacture of the wall-paper or directly to the wall, there is no loss of paint, as it can be kept for any length of time. The paper is not affected by the damp or moist walls. The paint will not change its original color or condition, owing to the protective quality of the gutta-percha and gum employed.

The paints dry quickly and furnish a superior quality for wall-paper, and a more permanent paint.

The paint composition can also be made up in dry form by mixing the pulverized gutta-percha, Venetian turpentine, and pigment, and carefully mixing it with spirits of turpentine under continuous stirring before application.

Having thus described my invention, I claim as new and desire to secure by Letters Patent—

A paint composition consisting of spirits of turpentine, gutta-percha, Venetian turpentine, and a dry-ground pigment, about in the proportions given, substantially as set forth.

In testimony that I claim the foregoing as my invention I have signed my name in presence of two subscribing witnesses.

GEORGE JORDAN.

Witnesses:
 CARL KARP,
 SIDNEY MANN.